United States Patent [19]
Asthana et al.

[11] Patent Number: 5,623,470
[45] Date of Patent: Apr. 22, 1997

[54] REALLOCATION OF DEFECTIVE RECORDING AREAS ON CD-R OR CD-E MEDIA

[75] Inventors: Praveen Asthana; John E. Kulakowski, both of Tucson, Ariz.

[73] Assignee: International Business Machines Corporation, Armonk, N.Y.

[21] Appl. No.: 578,869

[22] Filed: Dec. 28, 1995

[51] Int. Cl.$^6$ .................................................. G11B 7/00
[52] U.S. Cl. ................................................ 369/58; 369/54
[58] Field of Search ............................... 369/58, 54, 47, 369/48, 59, 32, 124; 360/39, 53

[56] References Cited

U.S. PATENT DOCUMENTS

| | | | |
|---|---|---|---|
| 4,706,136 | 11/1987 | Wentzel et al. | 360/39 |
| 4,835,757 | 5/1989 | Abiko | 369/54 |
| 4,949,326 | 8/1990 | Takagi et al. | 369/54 |
| 5,255,270 | 10/1993 | Yanai et al. | 371/10.2 |
| 5,319,626 | 6/1994 | Ozaki et al. | 369/54 |
| 5,341,359 | 8/1994 | Birukawa et al. | 369/107 |
| 5,351,227 | 9/1994 | Ichikawa et al. | 369/58 |
| 5,526,331 | 6/1996 | Park et al. | 369/58 |

*Primary Examiner*—Thang V. Tran
*Attorney, Agent, or Firm*—D. A. Shifrin

[57] ABSTRACT

Methods for recording information onto CD-Recordable and CD-Erasable optical disks are provided. In a first embodiment, after a session or packet of data is recorded, it is verified to detect unrecoverable errors. If no such errors are present, the session or packet is fixed and recording ends. If an unrecoverable error is detected, the session or packet is re-recorded in an area of the disk immediately following the originally recorded area. When the recorded data is verified as being readable, the session or packet is fixed by recording lead-in and lead-out areas on the disk and by updating a table of contents with the location of the verified data and not the originally recorded data. In a second embodiment, the data is checked as it is recorded. If a defect is suspected, recording halts and the presence of the defect is verified. If a defect is present, the data is re-recorded in an area of the disk immediately following the originally recorded area. When the data is verified as being readable, the session or packet is fixed and recording ends.

7 Claims, 2 Drawing Sheets

REALLOCATION OF DEFECTIVE RECORDING AREAS ON CD-R OR CD-E MEDIA

TECHNICAL FIELD OF THE INVENTION

The present invention relates to CD-R (recordable) and CD-E (erasable) recording, and in particular, to detecting recording errors and improving data reliability in CD-R and CD-E systems.

BACKGROUND OF THE INVENTION

Digital CD (compact disk) format optical systems were originally developed for mass distribution of music (audio files) with higher quality reproduction than was possible with analog tape or record systems. CD-ROM systems are an offspring of audio CD systems and used for mass distribution of computer-readable information (which can include audio, video and text as well as conventional computer "data"). Both audio CD's and CD-ROM's are pre-recorded by a stamping process and cannot be recorded onto by the user. New systems are being marketed to permit the user to record information on the media once (CD-R); newer systems that permit the user to record and erase information and to record new information onto the media (CD-E).

The format in which data is recorded onto CD-R and CD-E optical media (collectively referred to herein as CD-R/E) is substantially the same. Under current industry standards, each disk can hold up to 650 MB of data partitioned into up to 99 tracks (equivalent to 99 independently addressable files) when recorded during a single session. This limit is imposed by the number of entries that can be made in the Table of Contents (TOC) recorded on the disk. (It should be noted that efforts are being made to increase the disk capacity). A disk may also be partitioned into up to 45 sessions (and each session may be partitioned into one or more tracks) limited by the capacity of the disk to contain the recorded data and the required inter-session gaps. Consecutive sessions are separated by an inter-session gap (11,400 physical blocks for the first gap and 6,900 physical blocks for subsequent gaps) which includes a lead-in area (LIA) and a lead-out area (LOA). When recording, the optical head of the CD-R/E drive is located at the beginning of the recordable area of the disk (at the end of the last session if a multi-session disk), the inter-session gap is allocated, and one or more tracks of data is recorded. At the completion of recording the session, the LIA and LOA are written and the TOC (located in the program memory area (PMA) of the disk prior to the first user recordable area) is updated in a process known as "fixing". Recorded as a part of the LIA and the LOA is a copy of the TOC containing information regarding the starting track address of the current session as well as of all prior recorded sessions and the starting address of each track. When all of the data for the session has been recorded, the LIA and LOA recorded, the TOC is updated and the session is deemed to be "fixed"; the just recorded information cannot be re-recorded, corrected or otherwise modified in the same session area. Any modified data must be recorded in a new session and the TOC updated. Incremental packet recording is similar but with the input data broken into fixed length (or, in some versions, variable length) "packets", each with a link block, a LIA, a LOA and the data field. There is no limit on the number of packets which can be recorded, up to the available capacity of the disk.

There are currently no reliable methods for detecting and correcting errors encountered during the recording process of CD-R or CD-E media. These recording errors resulting from physical defects in the media, surface scratches, finger prints and other contamination can all cause permanent errors on read back rendering all or part of the data unrecoverable or defective. While a one or two consecutive bit unrecoverable error might not be a significant problem if audio or video information is involved, such an unrecoverable error in computer data is very serious.

In contrast, when data recorded onto magneto-optical (MO) or write-once, read-many (WORM) optical media is found to be defective, the data contents of the defective sector can be re-written to a spare sector in a designated spare area on the disk and a defect management table updated with a pointer from the defective sector to the replacement sector. The defect management table is then used to re-direct all references to the defective sector to the replacement sector, thus avoiding an error on read back.

SUMMARY OF THE INVENTION

In view of the foregoing, it is an object of the present invention to provide a robust CD-R/E drive system for detecting recording defects in CD-R/E media and reducing read back failures.

It is another object to provide such a system without adversely impacting drive performance.

These and other objects are achieved in this invention by providing methods for recording information onto CD-Recordable and CD-Erasable optical disks. In a first embodiment, after a session or packet of data is recorded, it is verified to detect unrecoverable errors. If no such errors are present, the session or packet is fixed and recording ends. If an unrecoverable error is detected, the session or packet is re-recorded in an area of the disk immediately following the originally recorded area. When the recorded data is verified as being readable, the session or packet is fixed by recording lead-in and lead-out areas on the disk and by updating a table of contents with the location of the verified data and not the originally recorded data. In a second embodiment, the data is checked as it is recorded. If a defect is suspected, recording halts and the presence of the defect is verified. If a defect is present, the data is re-recorded re-recorded in an area of the disk immediately following the originally recorded area. When the data is verified as being readable, the session or packet is fixed and recording ends.

The foregoing and other features and advantages of the invention will be apparent from the following more particular description of preferred embodiments of the invention, as illustrated in the accompanying drawings.

DETAILED DESCRIPTION OF THE INVENTION

Figure 1:
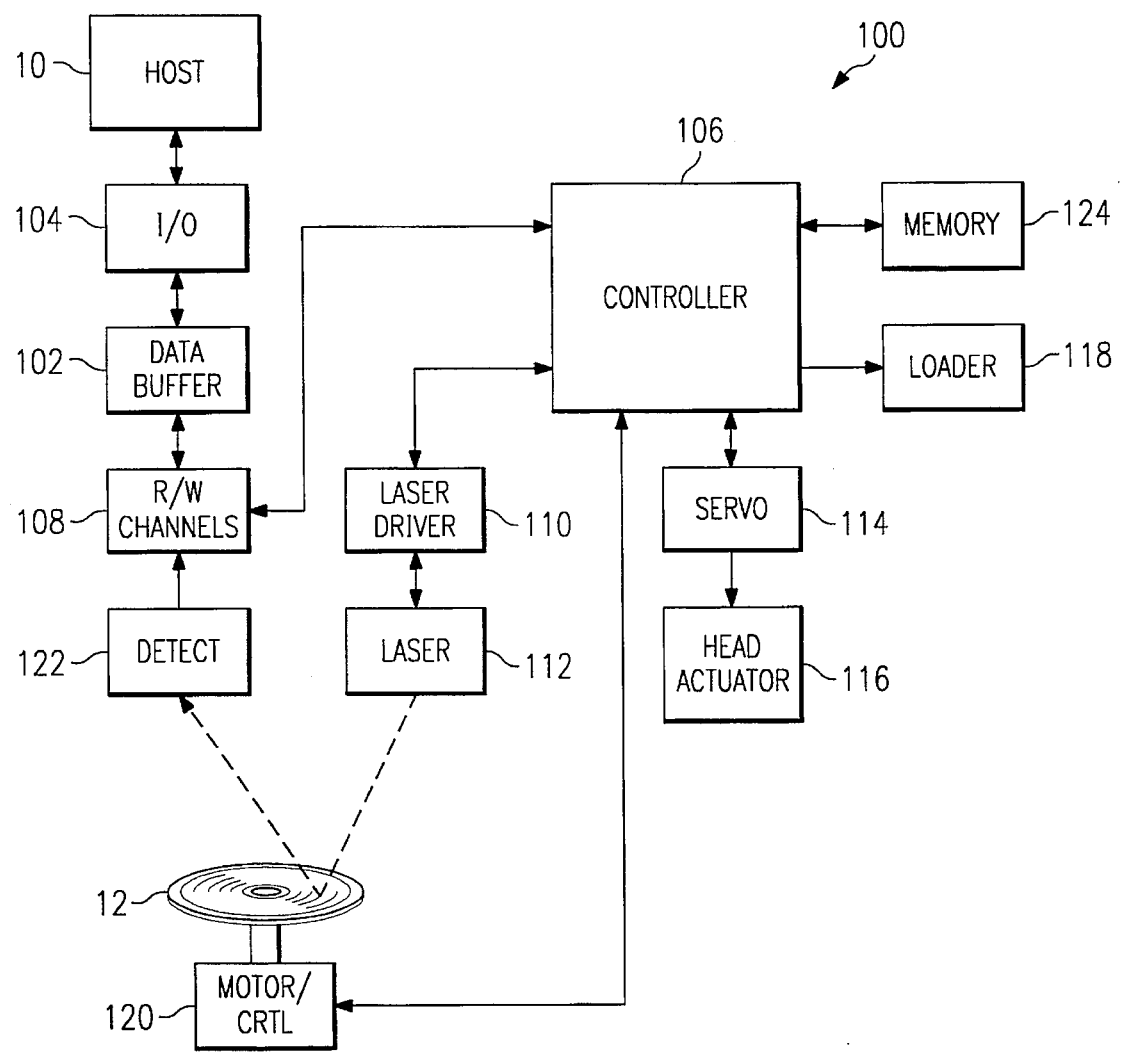
FIG. 1 is a block diagram of a CD-R/E drive of the present invention.

FIG. 1 is a block diagram of a CD-R/E drive 100 of the present invention interconnected with a host device 10 for writing data to and reading data from a CD-R/E format optical disk 12. The drive 100 and the host 10 exchange data into and out of a buffer 102 through an interface 104. A microprocessor controller 106 controls all of the functions of the drive 100, including read/write channels 108, a laser driver 110 (which, in turn, controls a laser 112), servo controls 114 (which direct the motion of the optical read/write head 116), a disk loader 118 and a spindle motor and controller 120. A detector module 122 receives laser light from the laser 112 which has been reflected off of a surface of the disk 12. A memory 124 can include both read only (ROM) and random access (RAM) memory for retaining control instructions and working data, respectively.

Figure 2:
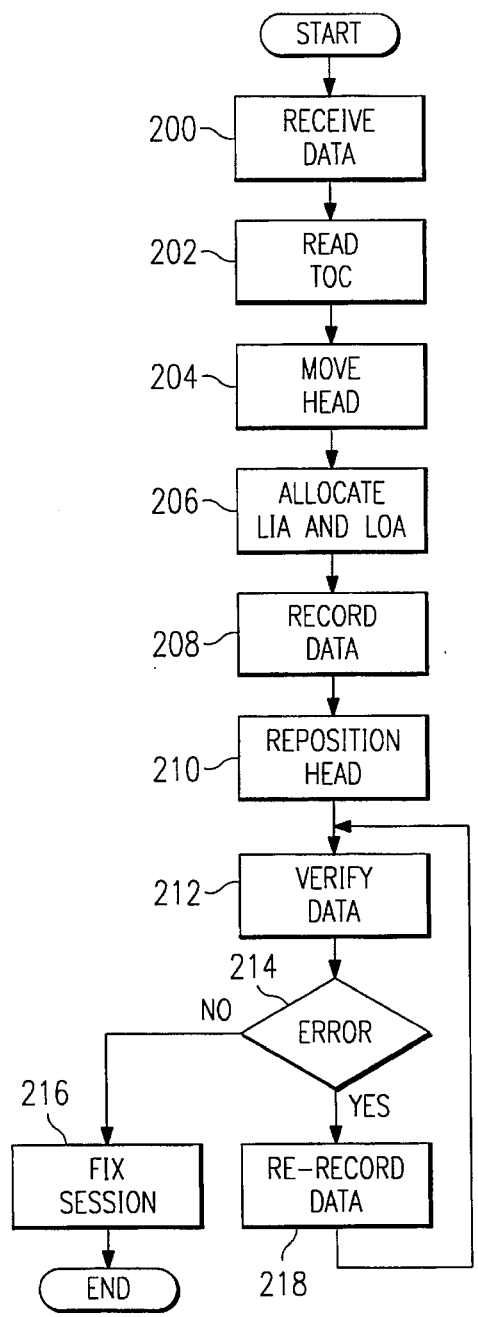
FIG. 2 is a flow chart of one embodiment of the present invention.

A first embodiment of the present invention will be described with reference to the flow chart of FIG. 2. Data to be recorded is received by the drive 100 from the host 10 through the interface 104 (Step 200). The drive 100 then reads a TOC (Step 202) from the program memory area (PMA) which contains the physical location (based upon recording time from the beginning of the recordable area) of each track and the starting track number of each session. In multi-session or track-at-once recording, a new recording session is then begun by moving the optical head 116 (Step 204) and focusing the laser beam onto the surface of the disk 12 immediately following the end of the last recorded session (or to the first recording area near the inner diameter of the disk 12 if no sessions have previously been recorded). The controller 106 then directs that lead-in blocks be allocated (Step 206) and one or more tracks are recorded with user data (Step 208). If more than one track is to be recorded during the session, at the completion of writing each track, the optical head 116 is repositioned to the beginning of the track (Step 210) and the just-recorded data is verified (Step 212). Although a bit-by-bit comparison of data can be performed when there is a requirement for the highest level of recording quality, it is faster and requires fewer resources for the data to be read by the laser 112 and parity checked to be sure that there are no unrecoverable errors (Step 214).

If only one track is to be recorded during the session, at the completion of writing the track and before the session is fixed, the optical head 116 is repositioned to the beginning of the track or session and the just-recorded data is verified. Again, a bit-by-bit comparison of data can be performed, but it is faster and requires fewer resources for the data to be read by the laser 112 and parity checked to be sure that there are no unrecoverable errors.

In both single- and multi-track sessions, when all of the data can be successfully read, the session is fixed by recording the LIA, the LOA and updating the TOC in the PMA (Step 216).

On the other hand, physical defects in the media, surface scratches, finger prints or other contamination can cause unrecoverable read errors to occur. If such errors are detected, the data is re-recorded beginning in the area of the disk 12 immediately following the just recorded area (whether it be a track or a session), thereby bypassing the defective area on the disk (Step 218). The re-recorded data is again verified (Step 212) and when the data can be read successfully, the session is fixed by recording the LIA, the LOA and updating the TOC (Step 216). The TOC will contain the location of the beginning of the session (that is, the location of the LIA) and the physical location of the track or tracks that have been recorded without error (the defective areas will not appear in the TOC). Consequently, the area of the session containing the unrecoverable defects does not appear in any TOC, cannot be addressed or accessed and will not be transferred to the host by the drive.

If the session is recorded using the "packet" writing process, at the completion of writing each packet, the optical head 116 is repositioned to the beginning of the packet and the just-recorded data is verified. Any packets which contain an unrecoverable error are re-recorded in the area of the disk immediately following the packet with the defect. Information regarding this fact would then be recorded in the TOC and the defective area bypassed during read back. Currently, the TOC structure does not have the capability to record the address of validly recorded packets but the size of the TOC could be extended to contain this information.

Figure 3:
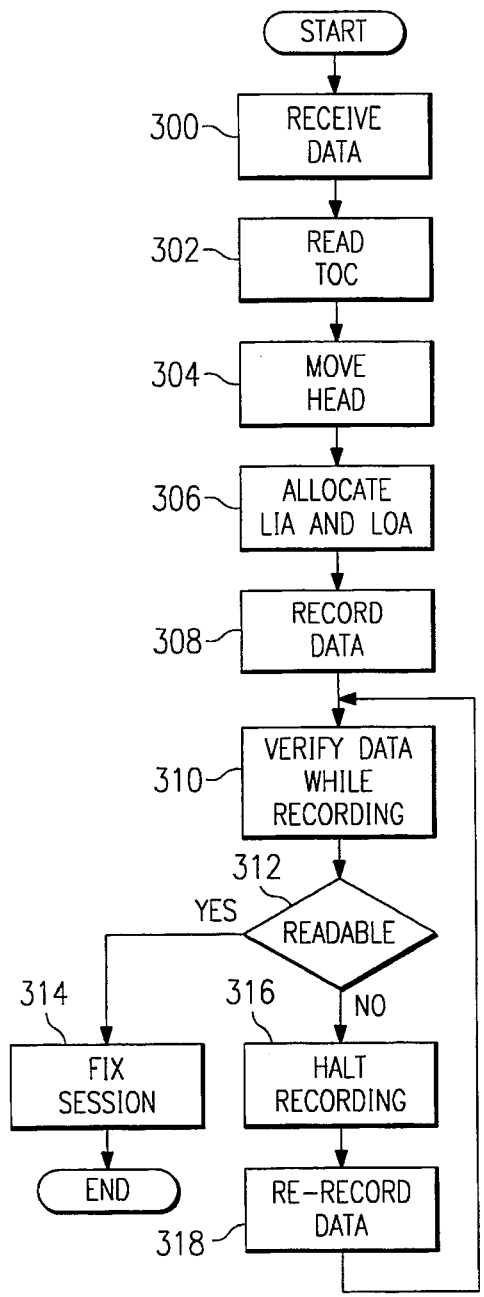
FIG. 3 is a flow chart of a second embodiment of the present invention.

A second embodiment of the present invention will now be described with reference to the flow chart of FIG. 3. The initial steps are the same as the initial steps of the first embodiment (Steps 300–308). Rather than record all of the customer data before verifying, however, the data is verified as it is recorded (Step 310) by analyzing the light from the laser 112 after it has been reflected from the surface of the disk 12. If the analysis indicates that the data can be successfully read (Step 312), the session is fixed as described above (Step 314). If unrecoverable errors exist, recording is halted at the end of the recordable unit (packet, track or session) (Step 316). The appropriate recordable unit is re-recorded beginning at a location immediately following the recordable unit containing the defective area (Step 318). Once the data is successfully verified, the session is fixed as described above. By re-recording data in an area immediately following the recordable unit containing the defective area before writing the next track or fixing the session, read-back performance is not degraded and unnecessary consumption of a limited number of tracks or sessions is avoided.

While the invention has been particularly shown and described with reference to preferred embodiments thereof, it will be understood by those skilled in the art that various changes in form and details may be made therein without departing from the spirit and scope of the invention.

What is claimed is:

1. In a machine-effected method of recording data onto a CD-R/E optical storage disk, the disk capable of storing data in a plurality of variable sized recording sessions, including the machine-executed steps of:

receiving a data to be recorded;

positioning an optical head at the beginning of a first selected area on the disk to which the data is to be recorded;

opening a session by allocating lead-in and lead out areas;

recording at least a portion of the data to a first recordable unit within the first selected area;

reading the recorded data for the presence of unrecoverable errors in the first recordable unit;

if no unrecoverable errors are found in the recorded data, fixing the session by recording lead-out and lead-in areas and updating a table of contents which contains an entry indicating location of the beginning of the first recordable unit; and if unrecoverable errors are found in the recorded data:
    positioning the optical head at the beginning of a second recordable unit on the disk immediately following the first recordable unit;
    re-recording the at least a portion of the data;
    reading the re-recorded data for the presence of unrecoverable errors in the second recordable unit; and
    if no unrecoverable errors are found in the re-recorded data, closing the session by recording the lead-in and lead-out areas and updating the table of contents which contains an entry indicating location of the beginning of the second recordable unit and not the first recordable unit.

2. In the machine-effected method of claim 1, wherein said step of reading the recorded data for the presence of unrecoverable errors in the first recordable unit comprises the machine executed steps of:

after the entire data has been recorded in the first recordable unit, re-positioning the optical head to the beginning of the first recordable unit; and verifying that the recorded data can be successfully read.

3. In the machine-effected method of claim 1, wherein said step of reading the recorded data for the presence of unrecoverable errors in the first recordable unit comprises the machine-executed steps of:

while the data is being recorded, analyzing a read-back signal for the presence of suspected recording errors;

if a suspected recording error is detected while the data is being recorded:

halting the recording of data;

re-positioning the optical head to the beginning of the first recordable unit; and verifying that the recorded data can be successfully read.

4. In the machine-effected method of claim 1, wherein the first and second recordable units are data tracks.

5. In the machine-effected method of claim 1, wherein the first and second recordable units are data packets.

6. An optical drive unit:

a disk loader;

an optical head;

read and write channels; and a controller for directing the recordation of a packet of data onto a CD-R/E optical storage disk by:

receiving data to be recorded;

positioning said optical head at the beginning of a first selected area on the disk to which the data is to be recorded;

opening a session by allocating lead-in and lead out areas;

recording at least a portion of the data;

while the data is being recorded, analyzing a read-back signal for the presence of suspected recording errors;

if a suspected recording error is detected while the data is being recorded:

halting the recording of data;

re-positioning the optical head to the beginning of the first selected area; and verifying that the recorded data can be successfully read;

if recorded data cannot be successfully read and an unrecoverable error is found in the recorded data:

positioning the optical head at the beginning of a second selected area on the disk following the first selected area;

re-recording at least a portion of the data; and when the recorded data can be successfully read, fixing the session by recording the lead-in and lead-out areas and updating the table of contents which contains an entry indicating location of the beginning of the second selected area and not the first selected area.

7. In a machine-effected method of recording data onto a CD-R/E optical storage disk, the disk capable of storing data in a plurality of variable sized recording sessions, including the machine-executed steps of:

receiving a data to be recorded;

positioning an optical head at the beginning of a first selected area on the disk to which the data is to be recorded;

opening a session by allocating lead-in and lead-out areas;

recording at least a portion of the data;

reading the recorded data for the presence of unrecoverable errors in the first selected area comprising the machine-executed steps of:

while the data is being recorded, analyzing a read-back signal for the presence of suspected recording errors;

if a suspected recording error is detected while the packet of data is being recorded:

halting the recording of data;

re-positioning the optical head to the beginning of the first selected area; and verifying that the recorded data can be successfully read;

if no unrecoverable errors are found in the recorded data, fixing the session by recording lead-out and lead-in areas and updating a table of contents which contains an entry indicating location of the beginning of the first selected area; and if unrecoverable errors are found in the recorded data:

positioning the optical head at the beginning of a second selected area on the disk immediately following the first selected area;

re-recording the at least a portion of the data;

reading the re-recorded data for the presence of unrecoverable errors in the second selected area; and if no unrecoverable errors are found in the re-recorded data, closing the session by recording the lead-in and lead-out areas and updating the table of contents which contains an entry indicating location of the beginning of the second selected area and not the first selected area.

\* \* \* \* \*